United States Patent [19]

Inselmann

[11] Patent Number: 5,501,764

[45] Date of Patent: Mar. 26, 1996

[54] APPARATUS FOR BONDING TEXTILE SHEET-LIKE STRUCTURES

[75] Inventor: Jürgen Inselmann, Löhne, Germany

[73] Assignee: Herbert Kennegiesser GmbH & Co., Vlotho, Germany

[21] Appl. No.: 235,148

[22] Filed: Apr. 28, 1994

Related U.S. Application Data

[63] Continuation of Ser. No. 885,826, May 20, 1992, abandoned.

[30] Foreign Application Priority Data

May 25, 1991 [DE] Germany .................. 41 17 170.5

[51] Int. Cl.⁶ ............................................ B23K 37/00
[52] U.S. Cl. .................. 156/580; 156/583.3; 156/583.5; 100/93 RP
[58] Field of Search ..................... 156/285, 555, 156/580, 583.1, 583.3, 583.5; 100/93 RP, 154, 211; 29/113.1, 113.2, 116.2

[56] References Cited

U.S. PATENT DOCUMENTS

| | | | |
|---|---|---|---|
| 2,911,729 | 11/1959 | Wood | 34/444 |
| 3,276,652 | 10/1966 | Conti | 226/191 |
| 3,932,252 | 1/1976 | Woods | 156/245 |
| 4,315,346 | 2/1982 | Demuth | 29/113.1 |

FOREIGN PATENT DOCUMENTS

| | | |
|---|---|---|
| 457273 | 11/1991 | European Pat. Off. . |
| 3519568 | 10/1986 | Germany . |
| 3502608 | 6/1988 | Germany . |
| 1324874 | 7/1973 | United Kingdom . |

OTHER PUBLICATIONS

"Fuse Line" IBS Engineers, Ltd., Oct. 1976, distributed at International Fair for Clothing Manufacturing Machines on Nov. 3–7, 1976.

Primary Examiner—David A. Simmons
Assistant Examiner—Paul M. Rivard
Attorney, Agent, or Firm—Sughrue, Mion, Zinn, Macpeak & Seas

[57] ABSTRACT

An apparatus for bonding textile sheet-like structures is disclosed. In the bonding of textile sheet-like structures (10, 11) it is very important, especially in the case of sensitive fabrics, to accurately control the pressure which is exerted. In conventional apparatuses of this kind, in which the pressure roller (23) and the contact roller (24) have an essentially -solid sleeve, this pressure is difficult to control because the thickness of the sheet-like structures (10, 11) which are to be processed varies. This results in pressures which are either too high or too low so that either the bonding is insufficient or the outer appearance of the sheet-like structures (10, 11) which are to be bonded is impeded. In order to avoid these disadvantages, the pressure roller (23) of the apparatus according to the invention has a tubular sleeve (26) which is resiliently deformable and which is subjectable to compressed air from a cavity (37) inside the pressure roller (23). As a result, the sleeve (26) always exerts a pressure on the sheet-like structures (10, 11) to be bonded which corresponds to the inner pressure in the cavity (37), without being affected by the thickness of the sheet-like structures (10, 11) or other influences. The apparatus according to the invention is particularly suitable for bonding outer fabrics made of (synthetic) micro-fibres with interlinings.

12 Claims, 5 Drawing Sheets

APPARATUS FOR BONDING TEXTILE SHEET-LIKE STRUCTURES

This is a Continuation of application No. 07/885,826, filed May 20, 1992, now abandoned.

BACKGROUND OF THE INVENTION

The invention relates to an apparatus for bonding textile sheet-like structures, especially outer fabrics and preferably interlinings, comprising a heating station and at least one pressure device which follows the heating station and which has a pressure roller and a contact means, and comprising at least one transport conveyor for transporting the sheet-like structures through the heating station and the pressure device.

In the manufacture of ready-made clothing, textile sheet-like structures have to be bonded. In this process, outer fabrics are bonded to interlinings. For this purpose, particularly the interlinings are provided with a coating of a suitable adhesive. This adhesive is activated under heat and pressure, such that the plasticised adhesive partially penetrates the outer fabric in order to bond the fabric to the interlining.

An apparatus of this species is known from DE-PS 35 02 608 (corresponding to U.S. Pat. No. 4,897,147). In this apparatus, the textile sheet-like structures are subjected to pressure in a pressure device. This pressure device comprises two pressure rollers which are assigned to opposite sides of a transport conveyor in order to exert linear pressure on the textile sheet-like structures. The pressure rollers have a solid steel sleeve. The steel sleeve of at least one pressure roller is provided with a coating of a rubber-like material. In spite of this coating, it can not be avoided that the pressure exerted in the roller gap between the pressure rollers varies, particularly if the textile sheet-like structures which are to be bonded are irregularly placed on the transport conveyor or have different thicknesses. Because of these changing pressures, the depth of penetration of the plasticised adhesive into the fabric of the outer material can not be accurately determined.

Especially in the case of (synthetic) micro-fibre fabrics, an accurate pressure which ensures a specific depth of penetration of the bonding agent into the outer fabric is immensely important. Particularly if the pressure is too high, either the contours of the interlinings show on the outer fabric or there is an undesired glossy effect or the bonding agent can be seen from the outside.

SUMMARY OF THE INVENTION

The invention is based on the object to create an apparatus of the above described type, which ensures a reliable and, above all, an optically perfect bonding of textile sheet-like structures.

An apparatus which attains this object comprises a pressure roller which has a resiliently deformable sleeve which is subjectable to pressure from the inside by means of a fluid (gas or liquid). This resiliently deformable sleeve adapts to varying heights of the textile sheet-like structures and to irregular arrangements of the fabrics on the transport conveyor, so that the pressure exerted on the textile sheet-like structures remains constant. The fluid pressure exerted on the sleeve corresponds to the specific surface pressure exerted on the textile sheet-like structures which are to be bonded.

In a preferred exemplary embodiment of the apparatus, the tubular sleeve delimits a portion of a cavity for receiving the fluid under pressure which is arranged inside the pressure roller. As a result, the fluid can directly exert an even pressure on a sufficiently large surface of the sleeve from inside the pressure roller.

According to the invention, the cavity is formed from a solid roller core which is at least partially surrounded by the resiliently deformable sleeve and is provided with a circular necked-down portion. This necking makes it easy to form a cavity which has the required dimensions.

According to a preferred development of the apparatus, the roller core is associated with at least one connection for introducing the fluid which is under pressure into the pressure roller. Expediently, the fluid is introduced through the center of at least one bearing journal which is arranged on an end face of the roller core, so that the fluid under pressure can be introduced with the aid of conventional connections, even when the pressure roller rotates.

BRIEF DESCRIPTION OF THE DRAWINGS

Preferred exemplary embodiments of the apparatus according to the invention are described below in detail with reference to the drawings, in which.

DESCRIPTION OF PREFERRED EMBODIMENTS

The illustrated apparatuses serve for bonding textile sheet-like structures 10 and 11, particularly an outer fabric (especially made of a synthetic micro-fibre) and an interlining coated with an adhesive. The textile sheet-like structures 10 and 11 are arranged on top of one another and are conveyed through the respective apparatus where they pass through various stations.

Figure 1:
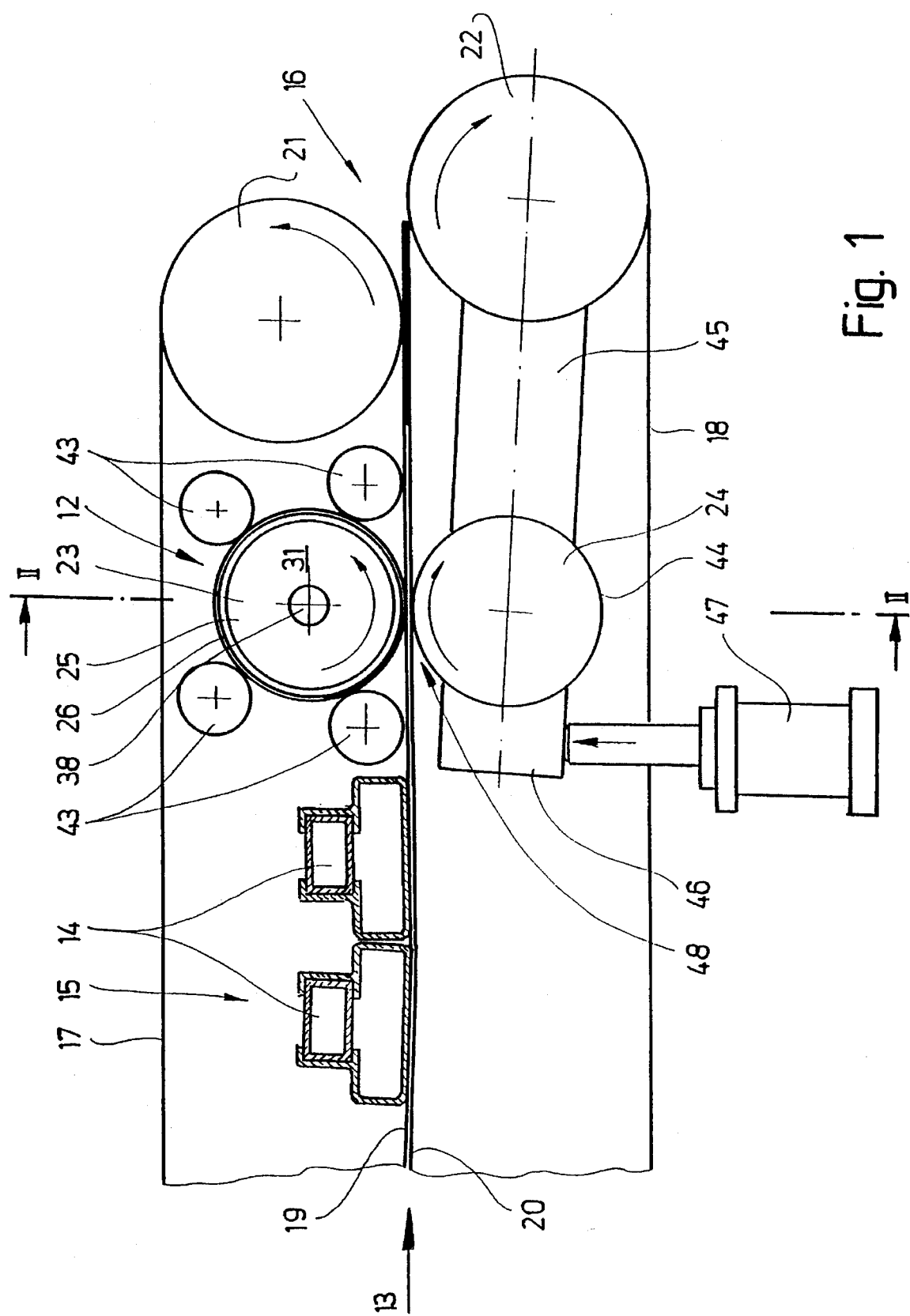
FIG. 1 is a schematic side view of part of a first embodiment of the apparatus in the region of a pressure device.
Figure 2:
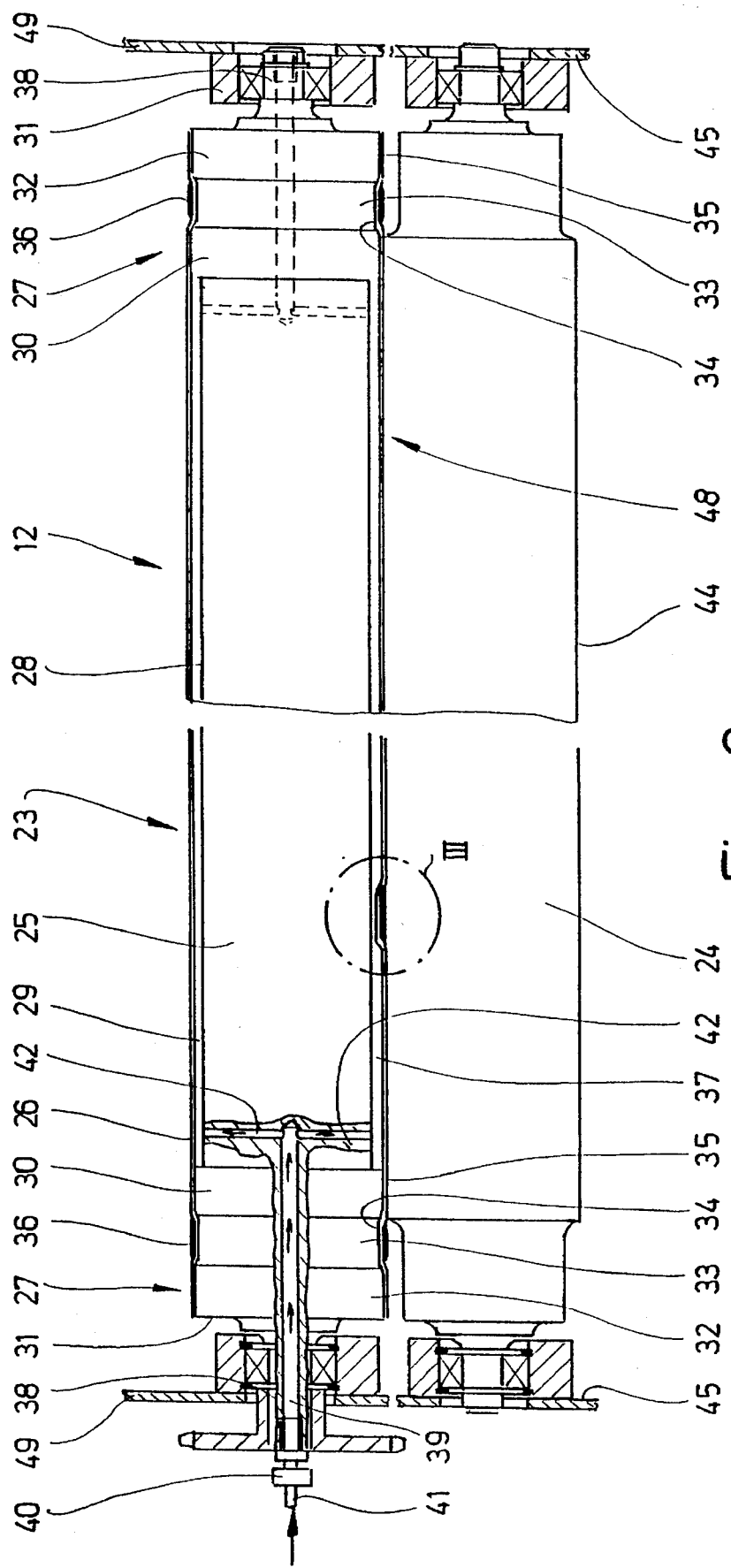
FIG. 2 shows a cross section II—II of the pressure device of the apparatus of FIG. 1.
Figure 3:
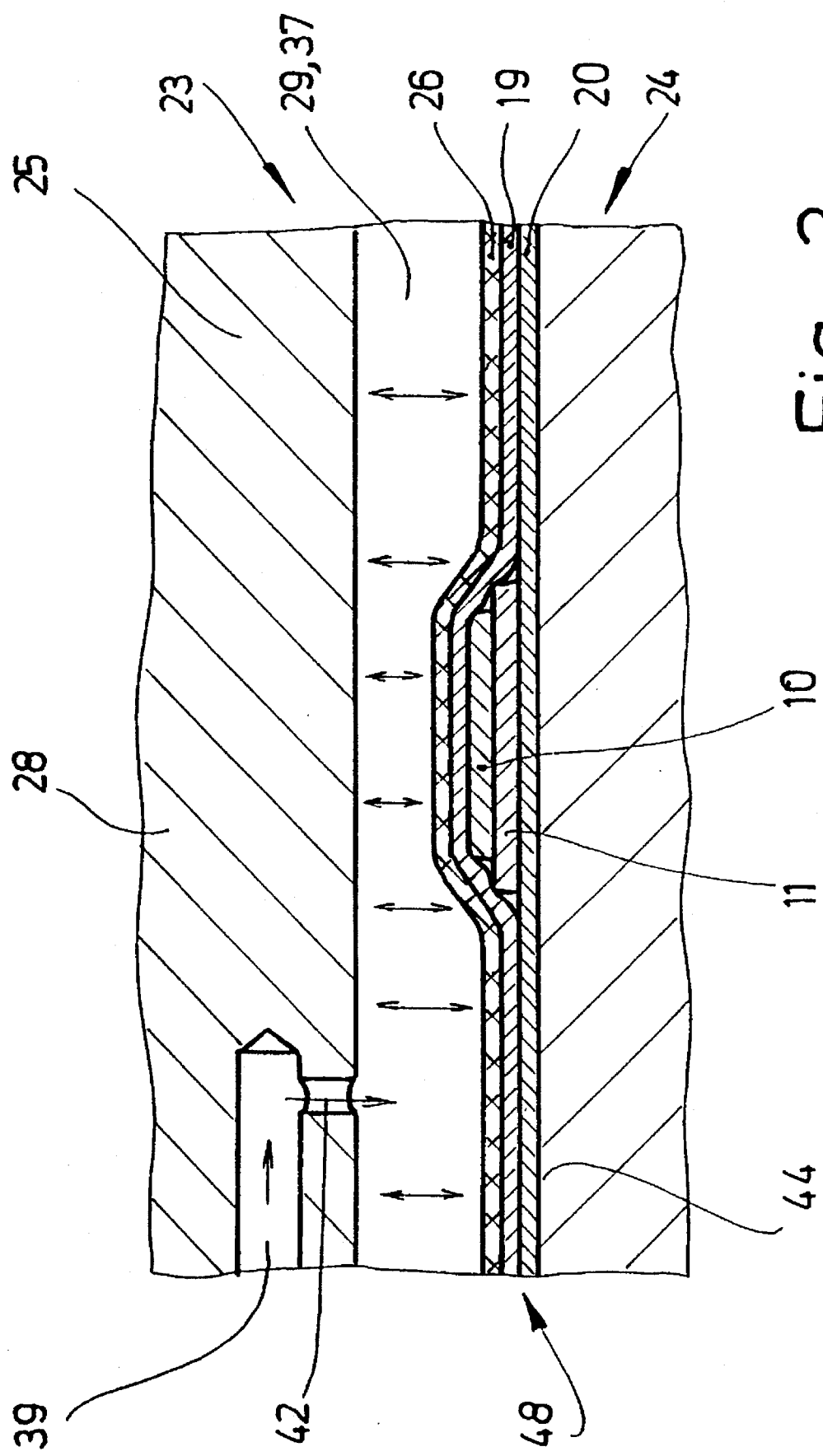
FIG. 3 shows a detail III of FIG. 2 in the region of two superposed sheet-like structures, on an enlarged scale.

The basic structure of the—only partly illustrated—apparatus of FIGS. 1 to 3 corresponds for example to that of the apparatus known from DE-PS 35 02 608. Accordingly, the superposed sheet-like structures 10 and 11 are, first of all, conveyed through a heating station 15 and subsequently through at least one pressure device 12 by means of an elongate or linear transport conveyor 16.

FIG. 1 shows a fraction of the apparatus in the region of the pressure device 12 which exerts a linear pressure on the sheet-like structures 10 and 11 which are to be bonded. Upstream of the pressure device 12 in the conveying direction 13, there are two heating elements 14 of the heating station 15. In this embodiment, the heating elements 14 are in the form of hollow profile heaters which approximately correspond to those of DE-PS 33 03 504.

The transport conveyor 16, which is only partially illustrated, comprises two transport belts, particularly an upper transport belt 17 and a lower transport belt 18. In the region of the transport path of the textile sheet-like structures 10 and 11 which leads through the apparatus, the transport belts 17 and 18 rest against one another with confronting conveying strands 19 and 20. Lying between the conveying strands 19 and 20 and covered thereby, the textile sheet-like structures 10 and 11 are conveyed through the heating station 15 and through the pressure device 12. In the illustrated exemplary embodiment, the transport belts 17 and 18 end, in the conveying direction 13, behind the pressure device 12. In this place, there are located drive rollers 21 and 22 for the respective transport band 17 and 18 which are arranged above one another and which are in this case longitudinally offset to one another.

The pressure device 12 is formed from a pressure roller 23 which is assigned to the upper transport belt 17 and a contact means which is assigned to the lower transport belt 18. In the illustrated embodiment, the contact means is in the form of a contact roller 24. Both rollers are rotatably mounted on a support frame 49 of the apparatus, which frame is only sketchily illustrated in FIG. 2. Only the pressure roller 23 is driven. Instead of the contact roller 24, a flat contact means, for example a contact plate, may be assigned to the lower transport belt 18. According to FIG. 1, the pressure roller 23 is located between the conveying strands of the upper transport belt 17, whereas the contact roller 24 is arranged between the conveying strands of the lower transport belt 18. The pressure roller 23 and the contact roller 24 rest against the outer sides of the conveying strands 19 and 20 of the transport belts 17 and 18 which operate in pairs, which outer sides are directed away from one another; the inner sides of strands 19 and 20 directly contact the sheet-like structures 10 and 11 sandwiched between the strands.

The pressure roller 23 is designed in a special way. According to FIG. 2, this pressure roller 23 comprises an inner roller core 25 made from a solid material, for example steel, and tubular sleeve 26 which covers the roller core 25 and which is made of a resiliently deformable material. This is a fabric material, which is preferably provided on both sides with a coating which is impermeable to air. At least on the outer side of the sleeve 26, this coating is smooth. In the illustrated exemplary embodiment, the sleeve 26 covers the entire roller core 25. Alternatively, the sleeve 26 may be shorter than the roller core 25 and only partially cover the roller core 25.

The roller core 25 comprises several portions with different diameters, in particular two outer end portions 27 and a center portion 28 arranged thereinbetween. The latter has a smaller diameter than the end portions 27 because it comprises a necking in the form of a continuous annular groove 29. The width of the center portion 28 corresponds at least to the working width of the apparatus, i.e. to the region of the transport conveyor 16 on which the sheet-like structures 10 and 11 which are to be bonded are deposited. Each end portion 27 is itself divided into three portions, particularly into an (inner) edge portion 30 which adjoins the annular groove 29, an (outer) edge portion 32 which adjoins the respective end face 31 of the roller core 25 and a middle portion located between 33 the edge portions 30 and 32. The middle portion 33 comprises a circular groove 34, so that the middle portion 33 has a smaller diameter than the two adjoining edge portions 30 and 32 which have identical diameters.

The sleeve 26 continuously extends with approximately the same diameter over the roller core 25. As a result, the sleeve 26 gives the pressure roller 23 a continuously cylindrical shape. The inner diameter of the sleeve 26 is defined such that the sleeve 26 contacts the edge portions 30 and 32 of each end portion 27 of the roller core 25.

The sleeve 26 is connected at its opposed edge portions 35 to the end portions 27 of the roller core 25, preferably in a releasable manner by means of a clamping ring 36. This ring 36 embraces the portions of the sleeve 26 which cover the middle portions 33 from the outside. By means of tightening the clamping ring 36 in an appropriate manner, the portions of the sleeve 26 which are covered by the ring 36 are pressed into the circular groove 34 of each middle portion 33 of the roller core 25. As a result, sleeve and core are connected and, at the same time, each edge portion 35 of the sleeve 26 is hermetically sealed on the roller core 25. The dimensions of, on the one hand, the clamping ring 36 and, on the other hand, the circular groove 34, are defined such that the outer wall of the clamping rings 36 are approximately flush with the outer side of the sleeve 26 when the clamping rings 36 are tightened.

Between the roller core 25 and the sleeve 26, the continuous annular groove 29 forms a cylindrical cavity 37 with a ring-shaped cross section between the end portions 27 of the roller core 25. This cavity 37 can be supplied with a pressurized fluid, for example compressed air, from both end faces 31 of the pressure roller 23. For this purpose, an air supply bore 39 is arranged in the pressure roller 23 and extends from the end face of each bearing journal 38 along the longitudinal mid-axis of said journal 38. An air supply line 41, which is only sketchily illustrated in FIG. 2, is connected to the air supply bore 39 via a rotary connection 40. The rotary connection 40 ensures that air can be supplied while the pressure roller 23 rotates. In the illustrated exemplary embodiment, the air supply bore 39 ends shortly behind the respective end portion 27 in the center portion 28 of the roller core 25. The end of each air supply bore 39 is associated with two or more air distributing bores 42 which extend in the radial direction transverse to the air supply bore 39.

These air distributing bores 42 extend through the center portion 28 and open out into the cavity 37. Alternatively, the air supply bore 39 could extend nearly up to the center of the pressure roller 23 and be associated with air distributing bores 42 which branch off this air supply bore 39 in different planes which are located behind one another.

As is evident from FIG. 1, the outer side of the pressure roller 23 is associated with supporting means, in particular four supporting rollers 43, which rest against the outside of the sleeve 26 and support this sleeve in such a manner that it retains its approximately cylindrical shape in spite of the pressure exerted with compressed air from the inside the cavity 37. The supporting rollers 43 are almost evenly distributed over the periphery of the sleeve 26, particularly in such a way that they are located between the strands of the upper transport belt 17.

The contact roller 24, which is located opposite the pressure roller 23, is conventionally designed and is made of steel and comprises a cylindrical roller sleeve 44. If required, this sleeve 44 may be provided with a thin coating of a rubber-like material. According to FIG. 2, the width of the roller sleeve 44 of the contact roller 24 is defined such that the roller sleeve 44 covers the resiliently deformable sleeve 26 only in the region of the center portion 28 and the edge portions 30 of the roller core 25 which adjoin the center portion 28 on both sides. As a result, it is ensured that the roller sleeve 44 of the contact roller 24 does not contact the clamping ring 36 which fixes the sleeve 26 on the roller core 25. Alternatively, it would also be possible to design the contact roller like the pressure roller 23, i.e. with a resiliently deformable sleeve 26 which can subjected to pressure exerted by a fluid.

According to FIG. 1, the contact roller 24 is movable up and down relative to the pressure roller 23 in order to be adjusted. For this purpose, the contact roller 24 mounted between two contact roller levers 45. On one end, the contact roller levers 45 are pivotably connected to the support frame 49 of the lower transport belt 18, particularly in the region where the drive roller 22 of the lower transport belt 18 is mounted. Free ends 46 of the contact roller levers 45 can be pivoted by means of pressure medium cylinders 47. The contact roller levers 45 are preferably associated with a locking means (not shown). The set distance between contact roller 24 and pressure roller 23 can be fixed by this locking means.

It is evident from FIG. 3 that, as a result of the pressure roller 23 which is designed according to the invention, it is possible to exert an even pressure across the entire width of the sheet-like structures 10 and 11 which are to be bonded. This pressure can be pre-selected by means of adjusting the inner pressure in the cavity 37. Depending on the material of the sheet-like structures 10 and 11 which are to be bonded, a pressure of 2 to 4 bar, especially 0.5 to 2.5 bar is employed. The specific surface pressure which is exerted by the resiliently deformable sleeve 26 on the superposed sheet-like structures 10 and 11, which are conveyed between the conveying strands 19 and 20 of the transport belts 17 and 18 through the roller gap 48, varies in proportion to said inner pressure. Regardless of the material of the sheet-like structures 10 and 11 which are to be bonded, the resiliently deformable sleeve 26 only exerts that pressure on the sheet-like structure 10 and 11 which is exerted on the inner side of the sleeve 26 by the compressed air in the cavity 37.

Figure 4:
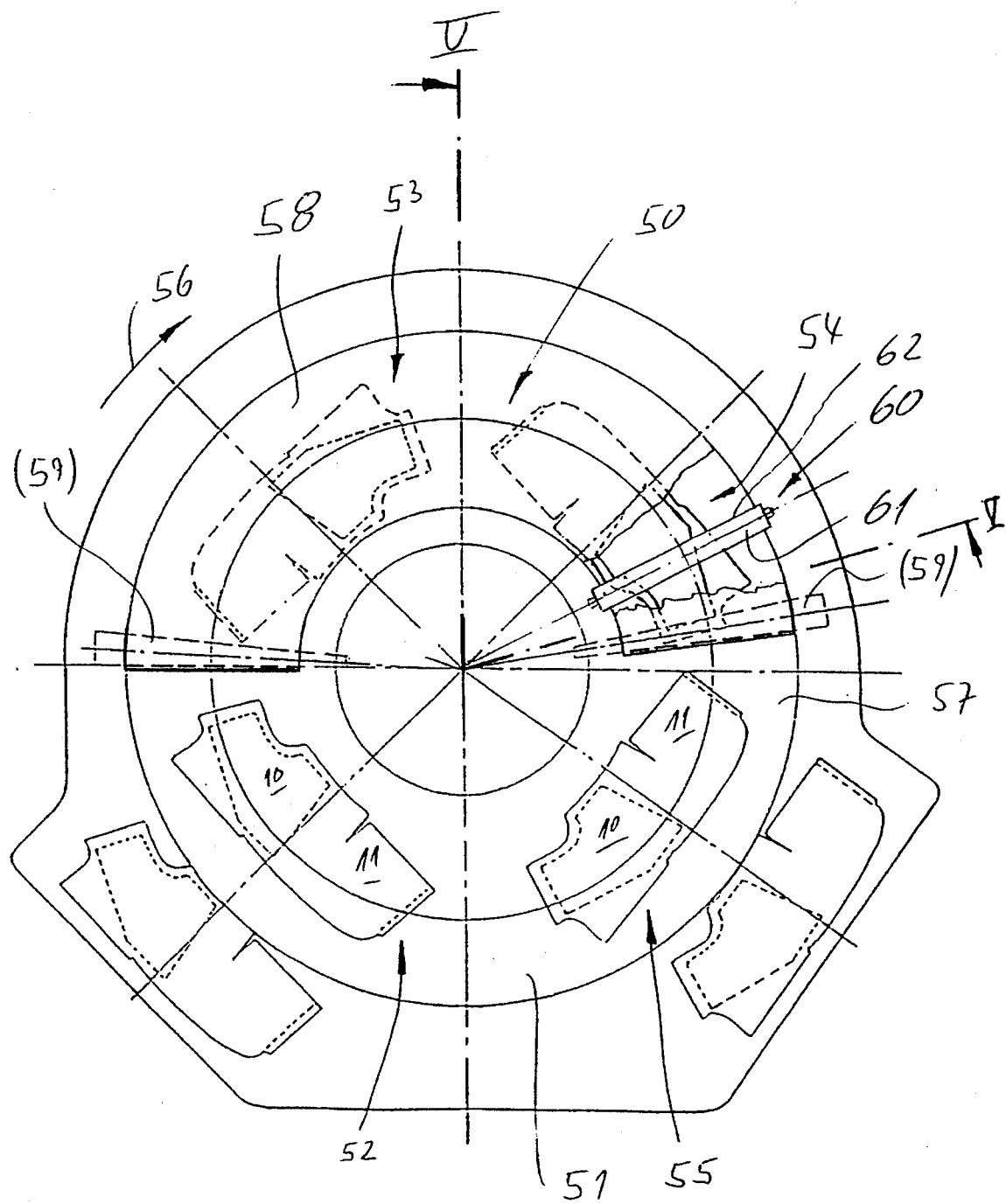
FIG. 4 is a schematic top plan view of a second embodiment of the apparatus.
Figure 5:
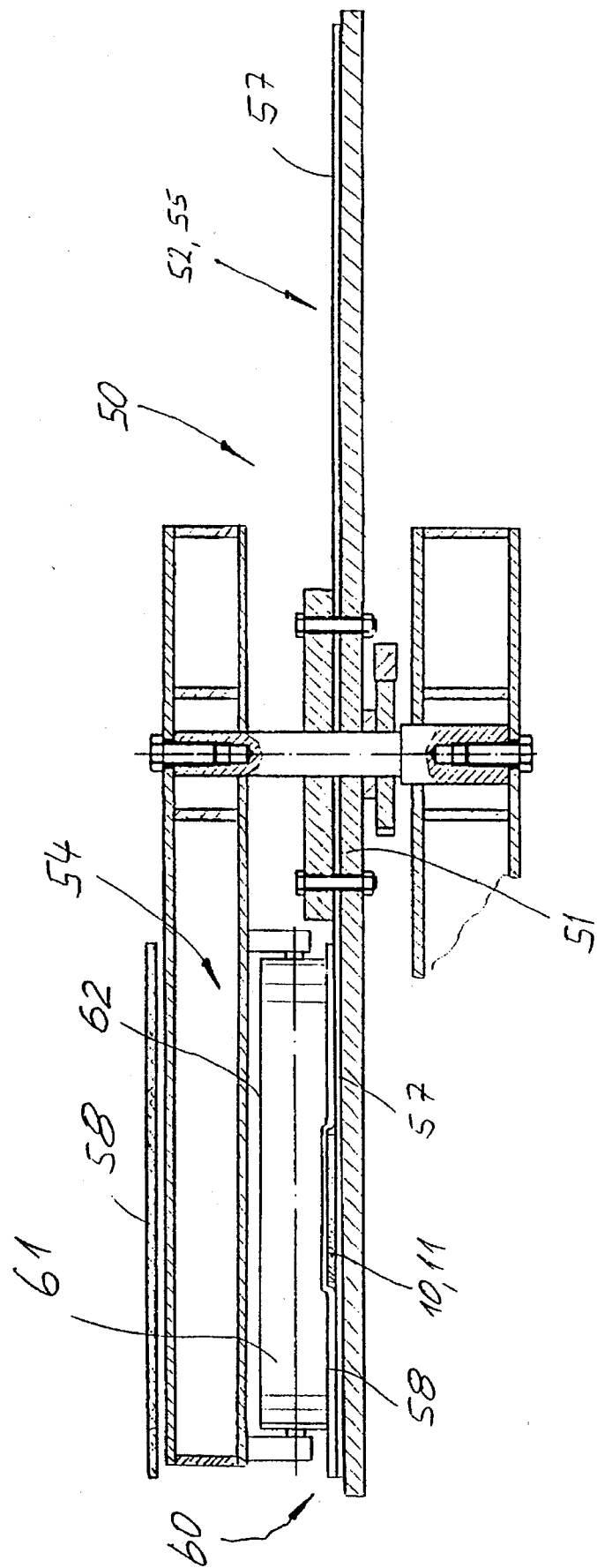
FIG. 5 shows a section V—V through half of the apparatus of FIG. 4, on an enlarged scale.

FIGS. 4 and 5 illustrate a second exemplary embodiment of the apparatus according to the invention. This embodiment comprises a turret-like transport conveyor 50 with a rotatingly drivable turntable 51. The turntable 51 is preferably driven intermittently, but it would also be possible to drive the turntable 51 to rotate continuously. The transport conveyor 50 comprises several stations or zones, particularly a feed station 52, a heating zone 53, a hot pressing station 54 and a discharge station 55, all of which being distributed over the periphery of the turntable 51, particularly in the above order, following one another in the conveying direction 56.

A supporting disc 57 which has a circular or annular shape is located on and covers the turntable 51 and is, itself, covered, in the regions of the heating zone 53 and the hot pressing station 54, by a covering disc 58 which is also circular or annular. The covering disc 58 is deflected by means of frustum-like deflecting rollers 59 in such a way that the supporting disc 57 is exposed in the regions of the feed station 52 and the discharge station 55 so that the sheet-like structures 10 and 11 can be deposited on and removed from the supporting disc. In the regions of the heating zone 53 and the hot pressing station 54, the sheet-like structures 10 and 11 are located between the supporting disc 57 and the covering disc 58.

The hot pressing station 54 is designed in a special way. This station 54 comprises a pressure device 60 formed from a pressure roller 61 and a contact means located opposite the roller 61. In the illustrated exemplary embodiment, this contact means is formed from the turntable 51. The pressure roller 61 is designed like the pressure roller 23 of the afore described exemplary embodiment of the invention (see FIGS. 1 to 3). Accordingly, the pressure roller 61 comprises a resiliently deformable sleeve 62, which can be subjected to pressure from the inside by means of a fluid. The sheet-like structures 10 and 11 which are embedded between the supporting disc 57 and the covering disc 58 are continuously conveyed underneath the pressure roller 61 as a result of the rotary drive of the turntable 51. In this process, the pressure roller 61 bears against the turntable 51 in such a way that a pressure is exerted on the supporting disc 57, the covering disc 58 and the sheet-like structures 10 and 11 located there inbetween, so that the sheet-like structures are pressed together.

Just like in the afore described exemplary embodiment, the pressure roller 61 can be driven to rotate. If required, it is possible to dispense with the separate drive of the pressure roller 61. In this case, the pressure roller 61 is moved by the rotatingly driven turntable 51 as a result of its contact with the covering disc 58.

In a modified version of the apparatus of FIGS. 4 and 5 which is not illustrated, the transport conveyor 50 comprises a stationary turntable 51 and only the supporting disc 57 and the covering disc 58 are driven. In this case, the pressure device is designed like that of the first exemplary embodiment of the apparatus as illustrated in FIGS. 1 to 3. In particular, it comprises a pressure roller 23 and a contact roller 24. The latter is located in an opening of the turntable 51 in the region of the hot pressing station 54. As a result, the supporting disc 57 and the covering disc 58, including the sheet-like structures located therein between, are moved through between the pressure roller 23 and the contact roller 24. In this embodiment, the supporting disc 57 and the covering disc 58 may also be associated with two pressure rollers 23, each comprising a resiliently deformable sleeve which can be subjected to pressure by means of a fluid.

I claim:

1. In an apparatus for bonding textile sheet-like structures and having a heating station, at least one pressure device which follows the heating station, and at least one transport conveyor, the improvement wherein:

the transport conveyor has two adjacent covering means (19, 20; 57, 58) between which the sheet-like structures are transportable through the heating station and into the pressure device;

the pressure device comprises a pressure roller (23, 61) having an outside adjacent one of said covering means, and a contact means (24, 51) having an outside adjacent the other of said covering means;

the pressure roller comprises a resiliently deformable sleeve which is subjectable to pressure from inside the sleeve by means of a fluid to maintain a constant and uniform pressure on each sheet-like structure passing between said pressure roller and said contact means;

the sleeve is cylindrical, the pressure roller (23) has a solid roller core (25) which is at least partially surrounded by the cylindrical sleeve (26), and the cavity (37) is formed between the sleeve (26) and the roller core (25) by a circular necking in the roller core (25);

the sleeve (26) is releasably connected with its opposed edge portions (35) to the roller core (25) in a sealing manner; and the sleeve (26) is connected to opposed end portions (27) of the roller core (25) which delimit the central necking of the roller core (25) on both sides and have a greater diameter than the necking.

2. The apparatus as claimed in claim 1, wherein a cavity (37) for receiving the fluid under pressure is arranged in the pressure roller (23) and adjoins the deformable sleeve (26), and wherein the two sheet-like structures have confronting surfaces at least one of which is coated with a heat- and pressure-activated adhesive which partially penetrates the other confronting surface, when the adhesive is activated by heat and pressure, to bond together the two sheet-like structures, a specific pressure being required to assure a specific, critical depth of penetration.

3. The apparatus as claimed in claim 1 or 2, wherein the end portions (27) have a circular groove (34) for receiving a fixing means for connecting edge portions (35) of the sleeve (26) to the end portions (27) of the roller core (25).

4. In an apparatus for simultaneously bonding together two or more heated textile sheet-like structures of the same or different thicknesses and arranged in stacks of different heights, said apparatus having a heating station, at least one pressure device which follows the heating station, and at least one transport conveyor for successively conveying the stacks through the heating station and to the pressure device, the improvement for applying an identical pressure to the two or more heated textile sheet-like structures arranged in a stack, regardless of said same or different thicknesses, wherein:

- the transport conveyor has two adjacent covering means (19, 20; 57, 58) between which the sheet-like structures are transportable through the heating station and into the pressure device;
- the pressure device comprises a pressure roller (23, 61) having an outside adjacent one of said covering means, and a contact means (24, 51) having an outside adjacent the other of said covering means, said pressure roller and said contact means defining therebetween a gap between which said stacks of sheet-like structures pass;
- the pressure roller comprises a resiliently deformable tubular sleeve which is subjectable to a constant pressure from inside the sleeve by means of a fluid to maintain, regardless of the thickness of the structures and regardless of the height of said stacks, a constant and uniform bonding pressure on each sheet-like structure passing through said gap between said pressure roller and said contact means, said tubular sleeve being deformable by said sheet-like structures, but said sheet-like structures being non-deformable by said tubular sleeve; and
- said tubular sleeve comprises a resiliently deformable fabric having a coating which is impermeable to air.

5. The apparatus as claimed in claim 4, wherein a cavity (37) for receiving the fluid under pressure is arranged in the pressure roller (23) and adjoins the deformable sleeve (26), and wherein the two sheet-like structures have confronting surfaces at least one of which is coated with a heat- and pressure-activated adhesive which partially penetrates the other confronting surface, when the adhesive is activated by heat and pressure, to bond together the two sheet-like structures, a specific pressure being required to assure a specific, critical depth of penetration.

6. The apparatus as claimed in claim 4 or 5, wherein the sleeve is cylindrical, wherein the pressure roller (23) has a solid roller core (25) which is at least partially surrounded by the cylindrical sleeve (26), and wherein the cavity (37) is formed between the sleeve (26) and the roller core (25) by a circular necking in the roller core (25).

7. The apparatus as claimed in claim 6, wherein the sleeve (26) is releasably connected with its opposed edge portions (35) to the roller core (25) in a sealing manner.

8. The apparatus as claimed in claim 5, wherein the pressure roller (23) is associated with a compressed air supply which opens out into the cavity (37).

9. The apparatus as claimed in claim 5, wherein the contact means is designed and is assigned to the pressure roller (23) in such a way that said contact means is located opposite the sleeve (26) at least in the region of the cavity (37).

10. The apparatus as claimed in claim 4, wherein the outer side of the sleeve (26) of the pressure roller (23) is associated with at least one supporting means.

11. The apparatus as claimed in claim 10, wherein the supporting means are in the form of supporting rollers (43) which contact the sleeve (26) on the outside and are distributed approximately evenly over the periphery of the sleeve (26).

12. The apparatus as claimed in claim 4, wherein the resiliently deformable sleeve (26) is formed from a support fabric with a double-sided coating which is impermeable to air, and wherein the coating which forms the outside of the sleeve (26) has a smooth design.

* * * * *